United States Patent

McLean

[15] 3,640,149
[45] Feb. 8, 1972

[54] VIBRATION DAMPERS UTILIZING REINFORCED VISCOELASTIC FLUIDS

[72] Inventor: Ronald L. McLean, Tonawanda, N.Y.

[73] Assignee: Houdaille Industries, Inc., Buffalo, N.Y.

[22] Filed: Aug. 26, 1969

[21] Appl. No.: 853,135

[52] U.S. Cl..................................74/574, 188/1 B, 267/136
[51] Int. Cl..........................................................F16f 15/10
[58] Field of Search........................74/574; 188/1 B; 252/13; 267/57, 64 R, 136, 182

[56] References Cited

UNITED STATES PATENTS 2,824,467   2/1958   O'Connor..............................74/574

3,373,633   3/1968   Desmond et al.........................74/574

FOREIGN PATENTS OR APPLICATIONS 1,310,391   10/1962   France....................................74/574

Primary Examiner—William F. O'Dea
Assistant Examiner—F. D. Shoemaker
Attorney—Hill, Sherman, Meroni, Gross & Simpson

[57] ABSTRACT

A vibration damper of the type having relatively movable parts with spaced confronting surfaces disposed to move in parallel relation during movement of the parts is provided with reinforced viscoelastic material in the space between the parts in engagement with the surfaces and shearingly resisting the relative movement.

8 Claims, 4 Drawing Figures

PATENTED FEB 8 1972

3,640,149

INVENTOR.
RONALD L. MCLEAN
BY Hill, Sherman, Meroni, Gross & Simpson ATTORNEYS

VIBRATION DAMPERS UTILIZING REINFORCED VISCOELASTIC FLUIDS

This invention relates to vibration dampers and is more particularly concerned with dampers of the type in which a viscous damping medium shearingly resists relative movement of parts of the damper.

Vibration dampers such as disclosed in U.S. Pat. No. 2,824,467 operate on the principle of damping vibrations, i.e., absorption of energy of potentially damaging vibrations in a member such as an automotive engine crankshaft, and the like, by the resistance to shearing of a film of a suitable viscous medium such as silicone disposed on and between spaced surfaces of a mounting member and a relatively movable inertia member of the damper. It has been proposed according to U.S. Pat. No. 3,234,817 to effect tuning as well as viscous damping by employing a stiff puttylike damping fluid with appropriate increase in the spacing between the relatively movable parts of the damper. For example, while excellent viscous damping can be attained throughout a wide range of damper sizes with a silicone which is rated at about 60,000 centistokes at 77° F., in a shear film spaced relationship between the working surfaces of the damper of from 0.006 to 0.009 inch, tuning in addition to viscous damping may be accomplished by use of a silicone rated at about 1 million centistokes with the clearance between the working surfaces of the damper on the order of 0.020 to 0.030 inch thereby taking advantage of the resilience of the highly viscous material for damping purposes. However, the cost of the damping medium, and especially silicone, increases virtually in proportion to the increase in viscosity due to the increased processing to which the material must be subjected in order to attain the greater viscosity. By way of example at current market prices 60,000 centistokes silicone fluid can be purchased commercially for about $1.50 per pound. On the other hand, 1,000,000 centistokes silicone costs about $15.00 per pound. Although in many instances the tuning advantages of the highly viscous damping medium may be desirable, the high cost of the damping medium rules it out competitively to rubber dampers, for example, although the rubber material is known to have disadvantages which are overcome by the use of viscoelastic material.

According to the present invention, the foregoing and other disadvantages, shortcomings, excessive cost, and other problems, are overcome by utilizing as the damping medium in tuned vibration dampers a reinforced viscoelastic material to attain viscous and tuned vibration damping.

An important object of the invention is to attain vibration damping advantages of viscoelastic material at greatly reduced cost.

Another object of the invention is to provide new and improved functioning of viscous vibration dampers by the use of fluids and reinforcements in combination enabling the achievement of effective viscous and tuned damping in a manner not feasible with the uncombined materials.

A further object of the invention is to provide viscoelastic damping at reasonable cost.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

Figure 1:
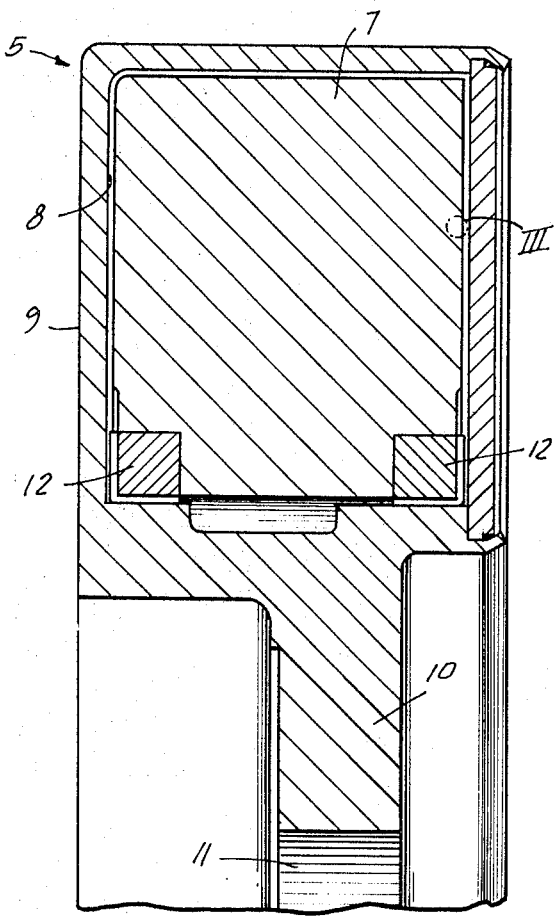
FIG. 1 is a representative fragmentary, radial sectional view through a torsional crankshaft vibration damper embodying features of the invention.

Representative of a form of vibration damper with which the present invention is especially useful is a crankshaft damper 5 (FIG. 1) comprising an annular inertia member or flywheel 7 which is freely relatively rotatably mounted within a complementary annular chamber 8 within a casing 9 provided with an attachment flange 10 which may have bolt holes 11 therethrough to facilitate securing the damper coaxially onto a shaft such as a crankshaft of an internal combustion engine subject to vibrations which must be damped for operating efficiency of the shaft and to prevent damage such as crystallization that may be caused by undamped vibrations. Within the chamber 8, the inertia ring 7 and the casing 9 have parallel confronting working surfaces, both at the periphery of the inertia member and at its axially facing sides, which are in shear film spaced relation, having regard to the viscosity of a damping medium loaded into and substantially filling the working chamber. To maintain the shear film spaced relationship between the working surfaces of the inertia member and the casing, the inertia member may be provided on its inner perimeter with suitable bearings 12.

Figure 2:
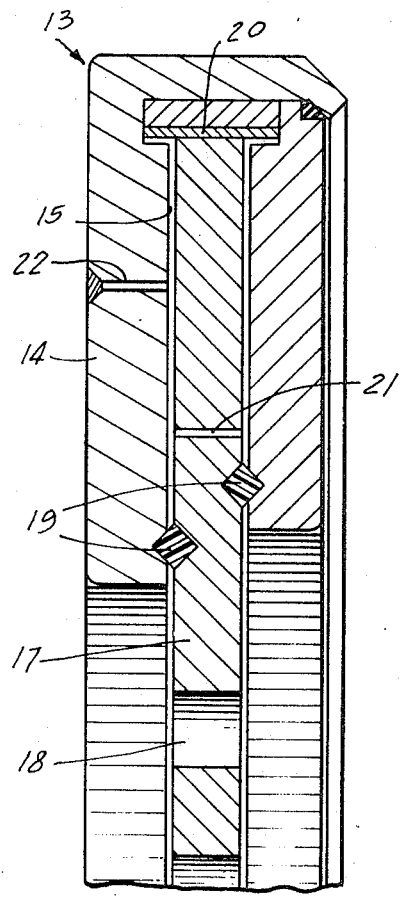
FIG. 2 is a fragmentary, radial sectional view through a modified form of the damper.

In another form of viscous vibration damper 13 (FIG. 2) an annular inertia ring structure 14 provides therein a working chamber 15 into which extends an annular portion of a mounting flange 17 which may be provided with suitable bolt holes 18 enabling fixed mounting of the flange on a shaft such as a crankshaft requiring damping of vibrations produced therein in operation. In this form of the damper combination sealing and spacer rings 19 may be mounted in and between the spaced parallel working surfaces of the flywheel casing and the mounting flange adjacent the inner perimeter of the flywheel casing. A bearing 20 may be mounted on the casing about and engageable by the outer perimeter of the mounting flange 17. Viscous damping medium within the chamber 15 is adapted to circulate between the opposite sides of the chamber through one or more equalization passages 21 through the flange 17. Filling of the chamber 15 may be effected through a filler opening 22 in the casing 14, hermetically sealed after filling has been accomplished.

Figure 3:
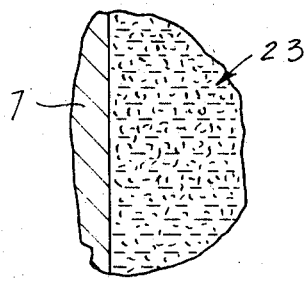
FIG. 3 is a greatly enlarged fragmentary sectional detail view taken at the circle III in FIG. 1.
Figure 4:
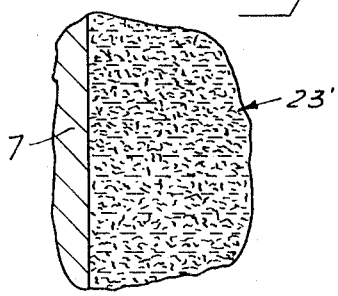
FIG. 4 is a similar view showing a different fluid to reinforcement ratio.

In either of the dampers 5 or 13, or any other preferred form of viscous damper, both viscous damping and tuned damping are adapted to be accomplished by having in the respective working chambers a reinforced viscoelastic material 23 (FIG. 3) or 23' (FIG. 4). Various materials are available which will provide the viscous damping fluid, among which the dimethyl-polysiloxanes and phenyl-methyl polysiloxanes (hereinafter referred to as silicone fluid) are presently considered the best for the purpose because of their ready availability, excellent thermal resistance and retention of properties under severe shearing. Other fluids that may be employed are petroleum based hydrocarbons, polyisobutylenes, diester and silicone blends.

In order to attain relatively high-viscoelastic tuning effect with a low-viscosity fluid, the fluid is reinforced with finely particulate material having the property in combination with the fluid of providing a viscoelastic response which neither of the materials by themselves would afford. Proper selection of fluid and reinforcement will provide any required combination of effective elastic and damping parameters. By way of example, a very small proportion of relatively dense, high strength, high Young's modulus, submicroscopic whiskers such as Beta SiC fibers having a typical analysis of about 74 percent $SiO_2$ and about 26 percent SiC added in proportion of about 1 to 4 percent by weight to silicone fluid matrix of from 30,000 to 60,000 centistokes will afford viscoelastic properties in the combined material of on the order of 1 million to 10,000,000 centistokes depending upon the calculated relative percentages of the fluid and solids. In addition to Beta SiC whiskers, other relatively dense solids in the form of whiskers or colloidal size particles selected from the metals, ceramics, rare earths, carbon, etc. may be employed as viscous fluid reinforcement where available and economically practical and capable of resisting centifugal sorting due to density disparity between fluid and reinforcement under operating conditions.

By way of emphasizing the economics of using a Beta SiC whiskers reinforced silicone, and having reference to current prices for available supplies, and assuming a vibration damper size in which about 0.4 pound of damping medium is required, a normally 60,000 centistokes silicone fluid at $1.50 per pound and Beta SiC whiskers at $100.00 per pound with a ratio of 2 percent by weight of the whiskers to silicone fluid, a resultant silicone fluid cost of 0.588 cents and a whiskers cost of 80 cents or a total cost of a $1.388 is seen. This will be observed as a quite nominal cost as compared to the same amount of a normally higher molecular weight (larger steady flow viscosity) fluid such as 1 million centistokes available at $15.00 a pound of which 0.4 of a pound will cost $6.00.

Even greater economies may be effected by utilizing as reinforcement for the viscous material plastics or elastomers in suitably minutely particulate form. Because of the much lower Young's modulus of such materials proportionately higher percentage by weight may be required to achieve a given composite viscosity and tuning elasticity. The proportions may be up to 95 percent of the reinforcement material to 5 percent of fluid for a fluid-polymer mixture comprising silicone fluid and nitrite-butadiene elastomer. Other plastics such as nylon, polypropylene, polyethylene, polytetrafluorethylene, and the like may be utilized; as well as elastomers such as natural rubber, styrene-butadiene, butyl, ethylene-propylene, urethane, fluorosilicone, and the like; and also glass whiskers or fibers, a principal consideration with respect to any of the materials mentioned being that they will effectively resist centrifuging migration under operating conditions to which subjected but will remain in substantially uniform dispersion or suspension in the liquid. In FIG. 4 the relatively greater density ratio of reinforcement to fluid is indicated illustratively at 23' by the substantially greater graphic densification of reinforcement relative to fluid as compared with 23 in FIG. 3.

From the foregoing it will be appreciated that the present invention enables obtaining precise viscoelastic behavior and long term retention of initial or design dynamic shear properties at a reasonable cost in tuned viscous dampers. An especially important field of utility is in torsional vibration control dampers in which an optimumly tuned and damped absorber is highly advantageous. Although the reinforced viscous damping fluids having a high ratio of fluid to reinforcement may require bearings to maintain the inertia mass and supporting structure in the preferred shear damping spaced relationship of the working surfaces, where the ratio is reversed, namely, a larger ratio of reinforcement to fluid as where the rubber or plastic reinforcements are used, the reinforced fluid material itself may function as bearing material to maintain the shear spacing between the working surfaces as initially assembled.

I claim:

1. A tuned viscous vibration damper including relatively moveable parts having spaced confronting surfaces which will move in parallel relation during movements of said parts, the improvement comprising:

reinforced viscoelastic material comprising Beta SiC fibers and viscous fluid of known viscosity in relative proportions exemplified by about 1 to 4 percent of fibers by weight to fluid of 30,000 to 60,000 centistokes viscosity located in the space between said parts and in engagement with said surfaces and adapted for shearingly and elastically resisting said relative movement for viscous and tuned vibration damping.

2. A damper according to claim 1, wherein said viscous fluid comprises silicone and said fibers comprise submicroscopic whiskers having an analysis of about 74 percent $SiO_2$ and about 26 percent SiC supported in a matrix of the silicone fluid.

3. A tuned viscous vibration damper including relatively movable parts having spaced confronting surfaces which will move in parallel relation during movements of said parts, the improvement comprising:

reinforced viscoelastic material comprising finely divided elastomeric material and viscous fluid in relative proportions exemplified by about 95 percent of elastomer to about 5 percent fluid located in the space between said parts and in engagement with said surfaces and adapted for shearingly and elastically resisting said relative movement for viscous and tuned vibration damping.

4. A damper according to claim 3, wherein said elastomeric material is of such minutely particulate form that it effectively resists centrifuging migration under operating conditions and will remain in substantially uniform dispersion in the fluid matrix.

5. A method of damping vibrations by means of a damper having a part adapted to be attached to a vibration prone member and a relatively movable part and in which the parts have spaced confronting surfaces which will move in parallel relation during movements of the parts, and comprising:

mixing Beta SiC fibers in a uniform dispersion in viscous fluid having a known natural viscosity in relative proportions exemplified by about 1 to 4 percent of whiskers to fluid of from 30,000 to 60,000 centistokes to provide a reinforced viscoelastic material:

loading the reinforced viscoelastic material into the space between said surfaces and into engagement with said surfaces; and elastically and shearingly resisting relative parallel movements of said surfaces.

6. A method according to claim 5, wherein the whiskers are mixed in uniform dispersion in silicone fluid.

7. A method of damping vibrations by means of a damper having a part adapted to be attached to a vibration prone member and a relatively movable part and in which the parts have spaced confronting surfaces which will move in parallel relation during movements of the parts, and comprising:

mixing into uniform dispersion finely divided elastomer in viscous fluid matrix in relative proportions exemplified by about 95 percent elastomer to about 5 percent fluid matrix to provide said reinforced viscoelastic material;

loading the reinforced viscoelastic material into the space between said surfaces and into engagement with said surfaces; and elastically and shearingly resisting relative parallel movements of said surfaces.

8. A method according to claim 7, wherein the finely divided elastomer is dispersed in silicone fluid to provide the viscous fluid matrix.

* * * * *